US006938541B2

(12) United States Patent
Vomberg

(10) Patent No.: US 6,938,541 B2
(45) Date of Patent: Sep. 6, 2005

(54) HEATEN PLATEN-TYPE PRESS

(75) Inventor: Rainer Vomberg, Wegberg (DE)

(73) Assignee: Siempelkamp Maschinen- und Anlagenbau GmbH & Co. KG, Krefeld (DE)

(*) Notice: Subject to any disclaimer, the term of this patent is extended or adjusted under 35 U.S.C. 154(b) by 100 days.

(21) Appl. No.: 10/263,357

(22) Filed: Oct. 2, 2002

(65) Prior Publication Data

US 2003/0066440 A1 Apr. 10, 2003

(30) Foreign Application Priority Data

Oct. 4, 2001 (DE) ........................................ 101 48 955

(51) Int. Cl.[7] .......................... B29C 33/04; B29C 43/52

(52) U.S. Cl. ....................... 100/316; 100/326; 100/194; 425/407

(58) Field of Search ................................ 100/305, 315, 100/316, 317, 318, 320, 324, 325, 326, 194, 195; 425/406, 407; 219/243, 245, 254, 468.1, 468.2

(56) References Cited

U.S. PATENT DOCUMENTS

| | | | | | |
|---|---|---|---|---|---|
| 1,550,185 | A | * | 8/1925 | Steenstrup | 219/531 |
| 3,754,499 | A | * | 8/1973 | Heisman et al. | 100/323 |
| 4,003,687 | A | * | 1/1977 | Hedin | 425/406 |
| 4,646,249 | A | * | 2/1987 | Tanioka et al. | 399/7 |
| 5,195,428 | A | * | 3/1993 | Gawlitta et al. | 100/73 |

FOREIGN PATENT DOCUMENTS

DE 570 005 1/1933

* cited by examiner

*Primary Examiner*—Derris H. Banks
*Assistant Examiner*—Shelley Self
(74) *Attorney, Agent, or Firm*—Herbert Dubno; Andrew Wilford

(57) ABSTRACT

A press has at least two rigid and generally planar platens each comprised of a rigid plate having a face, formed offset from the face with an array of heating passages, and formed with a separate array of grooves open at the face. A cover plate overlying the face is formed at the grooves with an array of throughgoing holes. A heat-exchange fluid is pumped through the heating passages of the core plate to heat the platen and steam is fed into the grooves and through the holes into a workpiece lying on the cover plate.

8 Claims, 3 Drawing Sheets

HEATEN PLATEN-TYPE PRESS

FIELD OF THE INVENTION

The present invention relates to a platen-type press. More particularly this invention concerns a press with one or more levels and heated platens.

BACKGROUND OF THE INVENTION

Panels such as plywood, chipboard, oriented-strand board, and fiberboard are typically made in multistage panel presses where the layers and/or fibers are hot pressed together with a binder to produce rigid finished panels. Not only must the press platens be heated and/or cooled to activate and cure the binder, but it is standard to inject steam, which may be superheated, into the workpieces as they are being pressed and even to suck any residual steam or other vapors out of the panels before the press is opened. Such a panel press is used for the production of oriented-strand board using heat-cured phenolic-resin binders. Melamine panels and structural members having thermosetting resins are also made in such a press.

Hence it is necessary to provide each platen with a network of heating or cooling passages through which a heat-exchange liquid is passed in order to maintain the platens at the desired temperature. Furthermore each platen is provided with a network or array of steam passages that communicate through a multiplicity of orifices with the surfaces of the platens. As mentioned above, this latter network can be pressurized with steam to inject steam into the workpiece, or can be evacuated to suck steam or other vapors out of the workpiece.

In a standard system as shown in German patent 570,005 the steam passages that open via the respective orifices at the platen faces are formed as blind bores that are connected to a manifold at one edge of the platen. This system often leads to uneven distribution of steam through the workpiece, with those portions close to the manifold getting more steam than the portions remote from the manifold. Such steam passages make it very difficult to form the necessary meander passages through which the heat-exchange liquid is flowed in the platen.

A system has been proposed where grooves are cut into the faces of the platen, and then perforated bars are welded into the grooves, turning the grooves into passages open laterally through the perforations in the bars. The bars must be set perfectly flush with the platen face to produce a smooth workpiece, and installation must be essentially perfect or the system will not work. Manufacture of such a platen is therefore very complex and expensive, and the finished product is never perfectly smooth. With time, the considerable thermal deformation the platen is subject to often leads to local deformations that are pressed into the workpieces, which deformations are aggravated by the fact that the bars are often of a material with a thermal coefficient of expansion that is different from that of the platen. Furthermore the bores in the bars often fill with particles from the workpiece so that eventually the platen must be replaced or meticulously cleaned.

OBJECTS OF THE INVENTION

It is therefore an object of the present invention to provide an improved platen press.

Another object is the provision of such an improved platen press which overcomes the above-given disadvantages, that is which has perfectly smooth platens that can be produced efficiently and at low cost and that are easy to service.

SUMMARY OF THE INVENTION

A press has according to the invention at least two rigid and generally planar platens each comprised of a rigid plate having a face, formed offset from the face with an array of heating passages, and formed with a separate array of grooves open at the face. A cover plate overlying the face is formed at the grooves with an array of throughgoing holes. A heat-exchange fluid is pumped through the heating passages of the core plate to heat the platen and steam is fed into the grooves and through the holes into a workpiece lying on the cover plate.

Such a platen can be made by the simple process of milling into its face the array of grooves, then fitting over the face the cover plate which is easily bored to have an array of holes that matches the grooves. The result is a pressing surface formed by the cover plate that is perfectly uniform, smooth or textured, and that is provided with an array of holes through which steam can be injected into the workpiece and/or through which vapor or liquid can be sucked from the workpiece.

According to the invention the platen press wherein the core plate is substantially thicker than the cover plate. In addition the cover plate is releasably secured to the core-plate face. This can be done through magnetism, that is by providing permanent magnets in one of the plates, typically the core plate, to hold the cover plate in place. Alternately bolts having heads flush with and bearing on the cover plate are used to secure it in place. Thus the cover plate in accordance with the invention can be removed easily for servicing or replacement in case it gets worn or its holes get plugged.

The core plate according to the invention has a pair of opposite faces each formed with a respective such array of grooves and each provided with a respective such cover plate. The bolts are throughgoing, extending through the respective core plate, and each have two such heads bearing on the respective cover plates.

The grooves are parallel and of polygonal section. In addition the cover plate has a thickness between 2 mm and 10 mm, preferably between 4 mm and 6 mm. It can have an outer textured face to print, for instance, a grain pattern on a panel.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
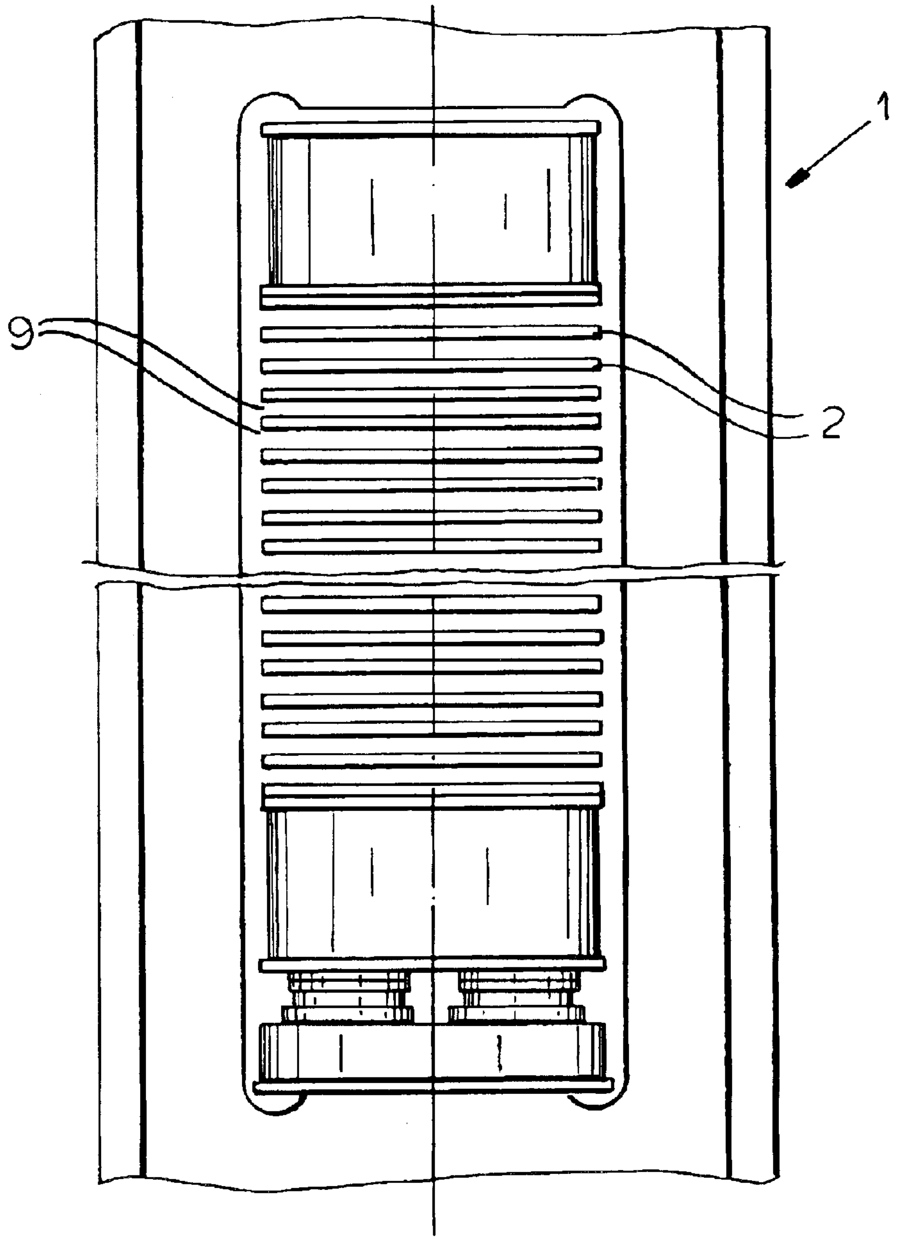
FIG. 1 is a mainly diagrammatic small-scale end view of a press according to the invention.
Figure 2:
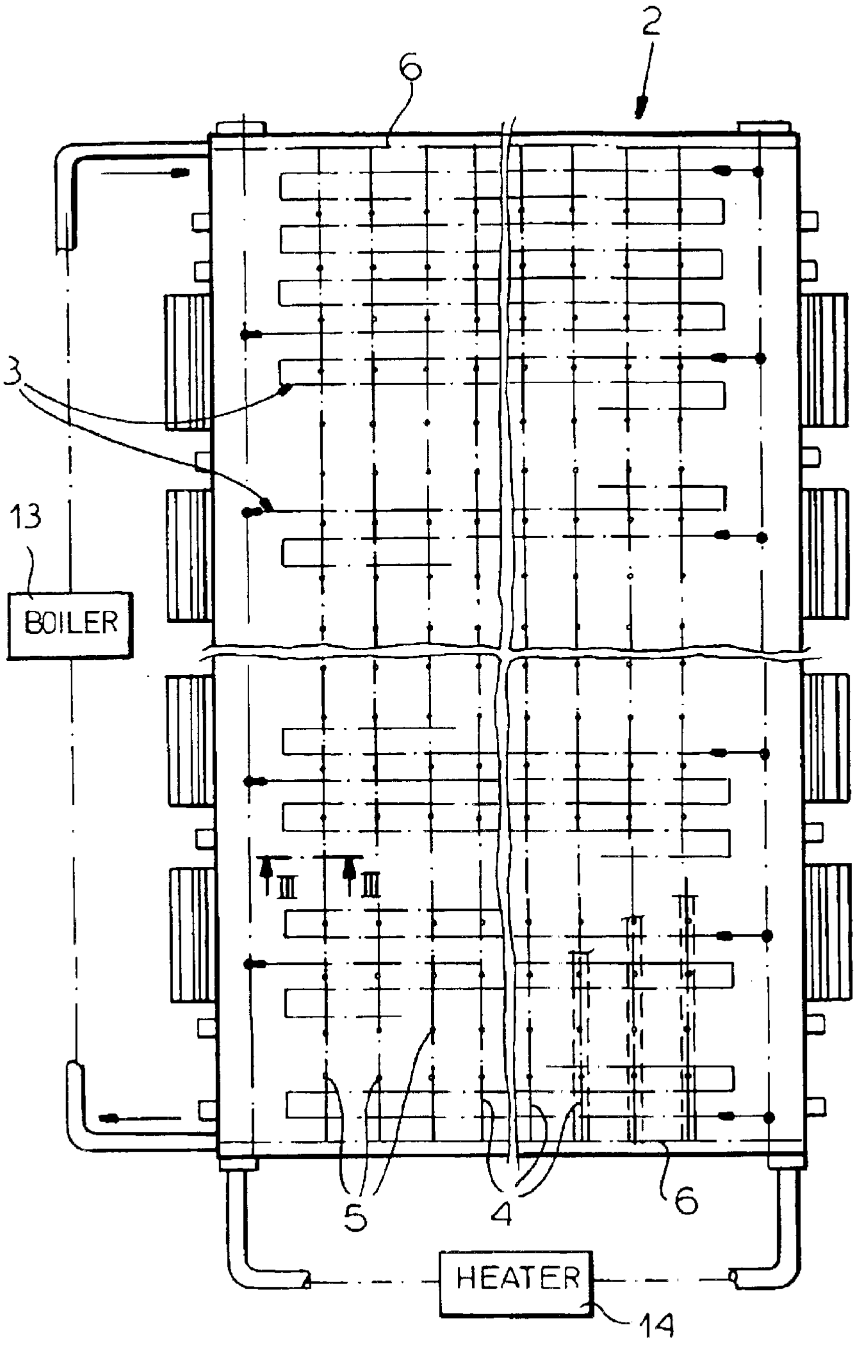
FIG. 2 is a larger-scale diagrammatic view of a platen of the press.

As seen in FIG. 1 a multistage platen press 1 for the production of oriented-strand board has a plurality of vertically spaced horizontal platens 2 defining a plurality of horizontally throughgoing pressing gaps 9. Each platen 2 has as shown in FIG. 2 a network or array of heating passages 3 connected to a heater 14 that serves to maintain the respective platen 2 at a desired temperature. In addition each platen 2 is formed with a wholly independent and separate network of treatment passages 4 connected at end manifolds 6 to a device, here a boiler 13, for injecting a treatment fluid, into them and withdrawing steam and any other fluids from them via an array of holes 5 uniformly spread over the entire surface of the respective platen 2. Such a press 1 is used to compress mats 8 in the gaps 9. The mats 8 ride on standard conveyor screens 12 through the gaps 9.

Figure 3:
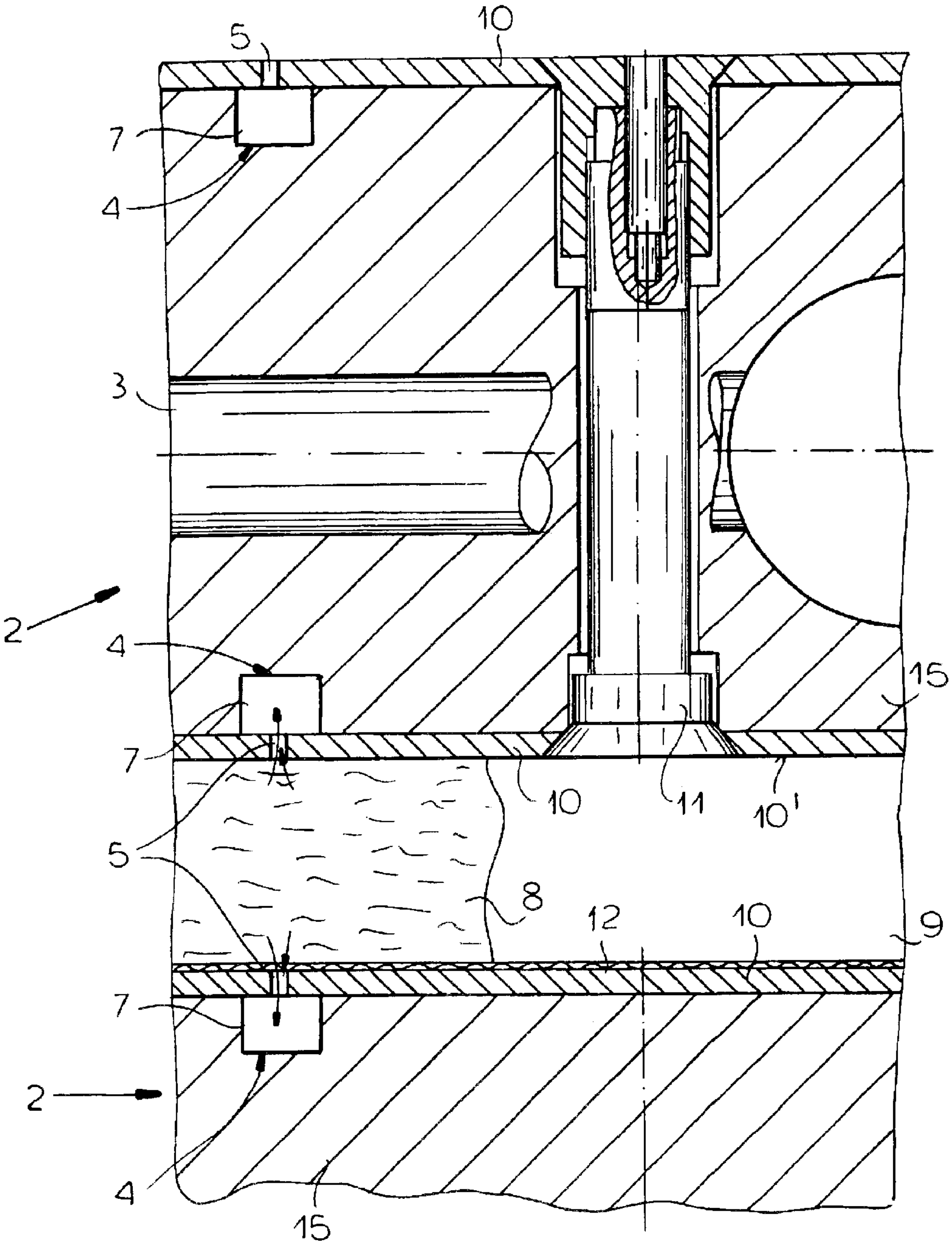
FIG. 3 is a large-scale section taken along line III—III of FIG. 2.

In accordance with the invention as shown in FIG. 3, the platens 2 are each formed of a relatively thick and massive core plate 15 normally made of steel or cast iron and a pair of thinner but rigid cover or face plates 10 normally made of steel. The passages 4 are formed as rectangular-section grooves 7 cut in the core plate 15 and each extending over the entire width or length of the platen 2. Furthermore each rigid metal cover plate 10, which may have a textured surface 10', is formed with an array of throughgoing circular bores constituting the holes 5 through which the fluid passes from the passages 4 into the workpiece 8 and from the workpiece 8 out into the passages 4.

The cover plates 10 are magnetized so that they cling to the massive steel plates 15. In addition double-headed flush bolt fasteners 11 are provided along the edges of the platens 2 to hold one such plate 10 on the top of and another plate 10 on the bottom of the respective plate 15.

I claim:

1. A press comprising:

at least two rigid and generally planar platens each comprised of a rigid core plate having a face, formed offset from the face with an array of heating passages, and formed with a separate array of grooves open at the face, and a cover plate overlying the face, laterally closing the grooves, and formed at the grooves with an array of throughgoing holes;

means for flowing a heat-exchange fluid through the heating passages of the core plate;

means for releasably securing the cover plate to the core-plate face; and means for pumping steam into the grooves and through the holes into a workpiece lying on the cover plate.

2. The platen press defined in claim 1 wherein the core plate is substantially thicker than the cover plate.

3. The platen press defined in claim 1 wherein the securing means includes magnetism of the plate.

4. The platen press defined in claim 1 wherein the securing means includes bolts having heads flush with and bearing on the cover plate.

5. The platen press defined in claim 4 wherein the core plate has a pair of opposite faces each formed with a respective such array of grooves and each provided with a respective such cover plate, the bolts being throughgoing, extending through the respective core plate, and each having two such heads bearing on the respective cover plates.

6. The platen press defined in claim 1 wherein the grooves are parallel and of polygonal section.

7. The platen press defined in claim 1 wherein the cover plate has a thickness between 2 mm and 10 mm.

8. The platen press defined in claim 1 wherein the cover plate has an outer textured face.

* * * * *